(12) United States Patent
Kiuchi et al.

(10) Patent No.: US 9,958,821 B2
(45) Date of Patent: May 1, 2018

(54) IMAGE FORMING APPARATUS THAT APPLIES A POWDER TO REDUCE ADHESION OF AN ADHESIVE LAYER

(71) Applicant: FUJI XEROX CO., LTD., Tokyo (JP)

(72) Inventors: Yutaka Kiuchi, Tokyo (JP); Masayo Higashimura, Kanagawa (JP); Kazuhiko Arai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/204,435

(22) Filed: Jul. 7, 2016

(65) Prior Publication Data
US 2016/0320736 A1 Nov. 3, 2016

Related U.S. Application Data

(62) Division of application No. 14/511,687, filed on Oct. 10, 2014, now Pat. No. 9,411,263.

(30) Foreign Application Priority Data

Jul. 21, 2016 (JP) .................................. 2014-127512

(51) Int. Cl.
*B05C 1/06* (2006.01)
*G03G 15/00* (2006.01)
(Continued)

(52) U.S. Cl.
CPC ........... *G03G 15/6582* (2013.01); *B05C 1/06* (2013.01); *B41F 23/00* (2013.01); *C09D 5/03* (2013.01);
(Continued)

(58) Field of Classification Search
CPC ............... G03G 15/6582; G03G 15/01; G03G 15/1695; G03G 15/6591; G03G 15/0822;
(Continued)

(56) References Cited

U.S. PATENT DOCUMENTS 4,566,783 A 1/1986 Schwierz et al.
5,494,645 A 2/1996 Tayama et al.
(Continued)

FOREIGN PATENT DOCUMENTS

JP H10-219199 A 8/1998
JP 2005-064266 A 3/2005
(Continued)

OTHER PUBLICATIONS

Mar. 21, 2017 Office Action issued in U.S. Appl. No. 15/204,495.
(Continued)

*Primary Examiner* — Laura Edwards
(74) *Attorney, Agent, or Firm* — Oliff PLC

(57) ABSTRACT

Provided is an image forming apparatus including an image forming unit that forms an image on a recording medium, and an applying unit that causes powder included in a liquid mixture to be interposed between the recording medium and the image forming unit by applying the liquid mixture to the recording medium, or to the image forming unit which comes into contact with the recording medium, wherein the recording medium includes an image forming layer, an adhesive layer, and a base layer, and the liquid mixture includes the powder reducing adhesion of the adhesive layer and volatile liquid.

2 Claims, 12 Drawing Sheets

(51) Int. Cl.
  *G03G 15/08* (2006.01)
  *B41F 23/00* (2006.01)
  *G03G 15/16* (2006.01)
  *C09D 5/03* (2006.01)
  *G03G 15/01* (2006.01)
  *G03G 15/10* (2006.01)

(52) U.S. Cl.
  CPC ......... *G03G 15/01* (2013.01); *G03G 15/0822* (2013.01); *G03G 15/1695* (2013.01); *G03G 15/6591* (2013.01); *B65H 2601/273* (2013.01); *G03G 15/104* (2013.01); *G03G 15/6517* (2013.01); *G03G 2215/00801* (2013.01); *G03G 2215/1666* (2013.01)

(58) Field of Classification Search
  CPC . G03G 2215/00801; G03G 2215/1666; G03G 15/104; G03G 15/6517; C09D 5/03; B65H 2601/273; B65H 37/02; B05C 1/06; B41F 23/00; B41F 23/002
  USPC .................................. 15/21.1, 179; 118/236
  See application file for complete search history.

(56) References Cited

U.S. PATENT DOCUMENTS

| | | | |
|---|---|---|---|
| 7,067,036 B2* | 6/2006 | Beckstrom | B05C 1/06 118/258 |
| 8,020,237 B2* | 9/2011 | Boatman | A46B 11/063 15/179 |
| 8,034,423 B2* | 10/2011 | Kawakami | B41M 5/0017 347/101 |
| 8,191,892 B2 | 6/2012 | Fuda | |
| 8,406,670 B2 | 3/2013 | Izawa et al. | |
| 8,923,712 B1 | 12/2014 | Kiuchi et al. | |
| 2009/0011352 A1 | 1/2009 | Cooper | |
| 2010/0148430 A1 | 6/2010 | Fuda | |
| 2011/0281026 A1* | 11/2011 | Moosbrugger | B05D 1/322 427/154 |
| 2013/0272733 A1* | 10/2013 | Zollner | G03G 15/104 399/57 |

FOREIGN PATENT DOCUMENTS

| | | |
|---|---|---|
| JP | 2005-279334 A | 10/2005 |
| JP | 2009-051589 A | 3/2009 |
| JP | 2010-089845 A | 4/2010 |
| JP | 2010-137947 A | 6/2010 |
| JP | 2011-013284 A | 1/2011 |
| JP | 4891447 B1 | 3/2012 |
| JP | 2013-052605 A | 3/2013 |
| JP | 5441522 B2 | 3/2014 |

OTHER PUBLICATIONS

Nov. 18, 2014 Japanese Office Action issued in Application No. 2014-127512.
October 19, 2015 Office Action issued in U.S. Appl. No. 14/511,687.
Apr. 4, 2016 Notice of Allowance issued in U.S. Appl. No. 14/511,687.
May 4, 2017 Office Action issued in Chinese Patent Application No. 201410742222.0.
Sep. 21, 2017 Office Action issued in U.S. Appl. No. 15/204,495.
Jan. 15, 2018 Office Action issued in Chinese Patent Application No. 201410742222.0.

* cited by examiner

| MATERIAL NAME | PARTICLE DIAMETER | TACK DEPRESSION (INITIAL) | BURYING-RESISTANT PROPERTY |
|---|---|---|---|
| SILICA (RY-50) | 0.04 μm | ○ | × |
| PMMA (MP116CF) | 0.5 μm | ○ | ○ |
| ZnSt (ZNS-S) | 6 μm | ○ | ○ |
| CALCIUM CARBONATE | 14 μm | ○ | ○ |
| TALC | 40-80 μm | × | ○ |

FIG. 10
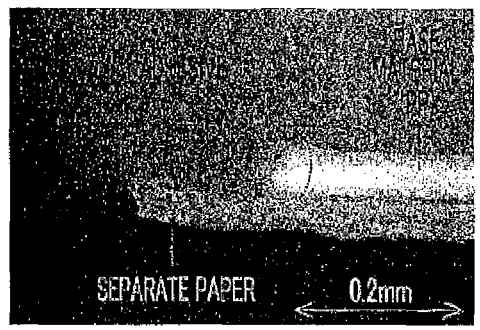
FIG. 11
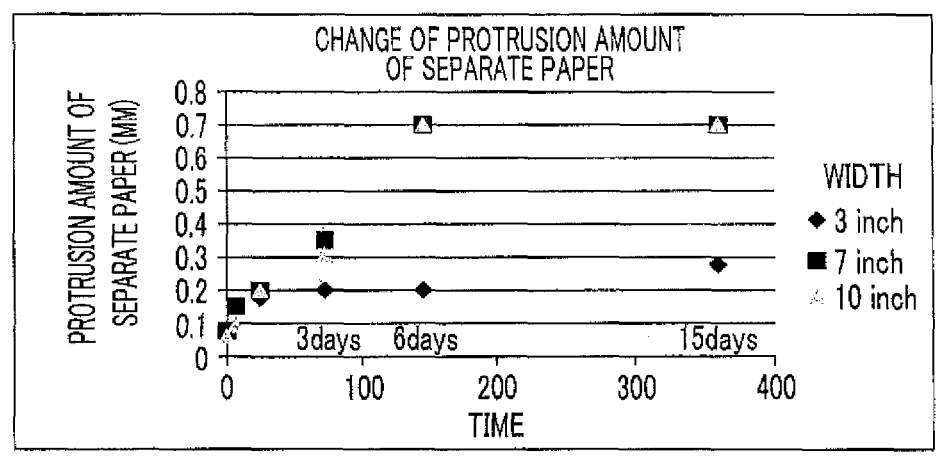
FIG. 12
|  | TRANSFER BELT | 2nd BTR | FIXING ROLL |
|---|---|---|---|
| COATED PAPER | O– | O | O |
| PP | XX (100 m) | O | O |
| PET | XX (100 m) | O | O |

FIG. 13

| NAME | TYPE OF PAPER | WIDTH | ENVIRONMENT | TRAVEL DISTANCE | JOB LENGTH | COATING AMOUNT (400m) | [RESULT] CONTAMINATION BY PASTE | [RESULT] SECONDARY PROBLEM |
|---|---|---|---|---|---|---|---|---|
| MAINTAINABILITY TEST | PP | 210 mm (FIXED) | Az | 10500 mm (50KPV) | 400 m (FIXED) | 8g (6%) | ○ | ○ |
| | | | | | | 16g (6%) | ○ | ○ |
| SYSTEM TEST | Mix (Coat, Uncoat, PP, PET) | Mix (7 TO 13inch) | Mix (Lab, Az, Cz) | 7300 m (35KPV) | Mix (10 TO 400m) | 8g (6%) | ○ | ○ |
| | | | | | | 16g (6%) | ○ | ○ |

IMAGE FORMING APPARATUS THAT APPLIES A POWDER TO REDUCE ADHESION OF AN ADHESIVE LAYER

CROSS-REFERENCE TO RELATED APPLICATIONS

This application is a divisional application of U.S. patent application Ser. No. 14/511,687 filed Oct. 10, 2014, now U.S. Pat. No. 9,411,263, which is based on and claims priority under 35 USC 119 from Japanese Patent Application No. 2014-127512 filed Jun. 20, 2014, the entire disclosure of which are incorporated by reference herein.

BACKGROUND (i) Technical Field

The present invention relates to an image forming apparatus, an applying device, an agent, and a transport device.

(ii) Related Art

In the related art, regarding an image forming apparatus, in accordance with diversified user needs, as a recording medium to form an image thereon, it is required to form an image on a special recording medium such as a so-called label paper having an adhesive layer which is formed of an adhesive in an intermediate portion thereof, in addition to plain paper.

SUMMARY

According to an aspect of the invention, there is provided an image forming apparatus including:

an image forming unit that forms an image on a recording medium; and an applying unit that causes powder included in a liquid mixture to be interposed between the recording medium and the image forming unit by applying the liquid mixture to the recording medium, or to the image forming unit which comes into contact with the recording medium, wherein the recording medium includes an image forming layer, an adhesive layer, and a base layer, and the liquid mixture includes the powder reducing adhesion of the adhesive layer and volatile liquid.

BRIEF DESCRIPTION OF THE DRAWINGS

Exemplary embodiments of the present invention will be described in detail based on the following figures, wherein:

FIG. 10 is a diagram illustrating an end portion of the label paper in which protrusion of an adhesive occurs;

FIG. 11 is a graph illustrating a relationship between a period for the label paper left in a high temperature and high humidity environment and protrusion of separate paper;

FIG. 12 is a table illustrating adhesion states of the adhesive, respectively corresponding to material properties of surface base materials of the label paper;

FIG. 13 is a table illustrating traveling conditions and an experimental result of the label paper in an image output device;

DETAILED DESCRIPTION

Hereinafter, an exemplary embodiment of the invention will be described with reference to the drawings.

First Exemplary Embodiment

Figure 1:
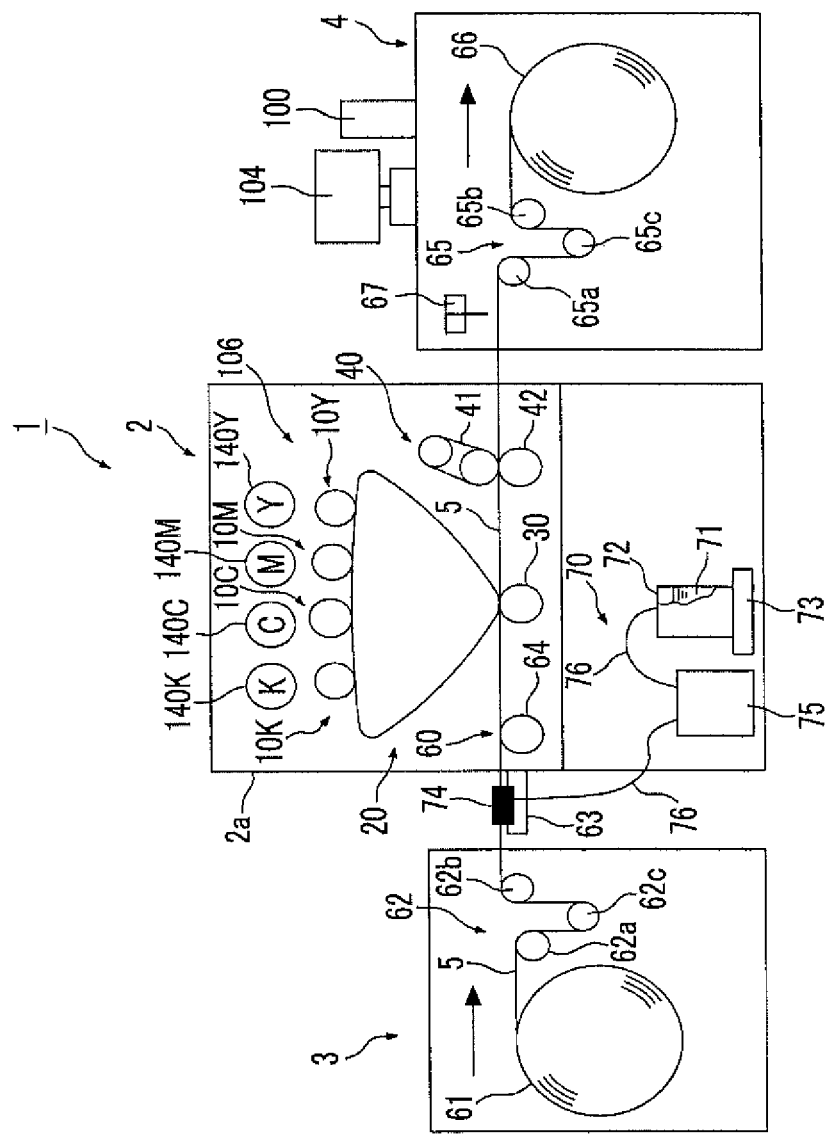
FIG. 1 is a configuration diagram illustrating an image forming apparatus according to a first exemplary embodiment of the invention.

FIG. 1 is a configuration diagram illustrating an overall scheme of an image forming apparatus in which a coating agent, a coating device, and a transport device according to a first exemplary embodiment of the invention are applied.

Overall Configuration of Image Forming Apparatus

An image forming apparatus 1 according to the first exemplary embodiment is configured to be a color printer, for example. The image forming apparatus 1 includes an image output device 2 that forms an image using toners of four types of colors of yellow (Y), magenta (M), cyan (C), and black (K); a sheet feeding device 3 that supplies continuous paper 5 as an example of a recording medium; a sheet discharge device 4 that discharges and accommodates the continuous paper 5 on which an image is formed by the image output device 2; and a control device 100 that is provided in an upper portion of the sheet discharge device 4 and controls the image output device 2, the sheet feeding device 3, and the sheet discharge device 4. In the illustrated image forming apparatus 1, the sheet feeding device 3, the sheet discharge device 4, and the control device 100 are separately arranged outside the image output device 2. However, naturally, the image output device 2 and at least a portion of the sheet feeding device 3, the sheet discharge device 4, and the control device 100 may be integrally arranged in the image forming apparatus 1.

The image output device 2 includes an electrophotographic image forming portion 106 as an example of an image forming unit that forms an image on a recording medium based on image data. The image forming portion 106 includes plural image-forming devices 10 that form toner images developed by the toners configuring a developer, an intermediate image transfer device 20 that individually holds the toner image formed by each of the image-forming devices 10 so as to transport to a secondary image transfer position where a secondary image transfer is ultimately performed on the continuous paper 5, a transport device 60 that transports the continuous paper 5 which is necessary to be supplied to the secondary image transfer position of the intermediate image transfer device 20, and a fixing device 40 as an example of a fixing unit that performs heating to fix the toner images obtained through the secondary image transfer by the intermediate image transfer device 20 on the continuous paper 5.

For example, the image output device 2 may be configured to be a color copier when an image reader is added and is equipped as an image reading unit (not illustrated) which inputs an original document image to be formed on the continuous paper 5. Reference numeral 2a in the drawing indicates a housing of the image output device 2, and the housing 2a is configured to have a support configuration member, an outer cover, and the like.

The image-forming devices 10 are configured to have four image-forming devices 10Y, 10M, 10C, and 10K exclusively forming each of toner images of four types of colors of yellow (Y), magenta (M), cyan (C), and black (K). The four image-forming devices 10Y, 10M, 10C, and 10K are arranged so as to be arrayed in a row in an inner space of the housing 2a.

Figure 2:
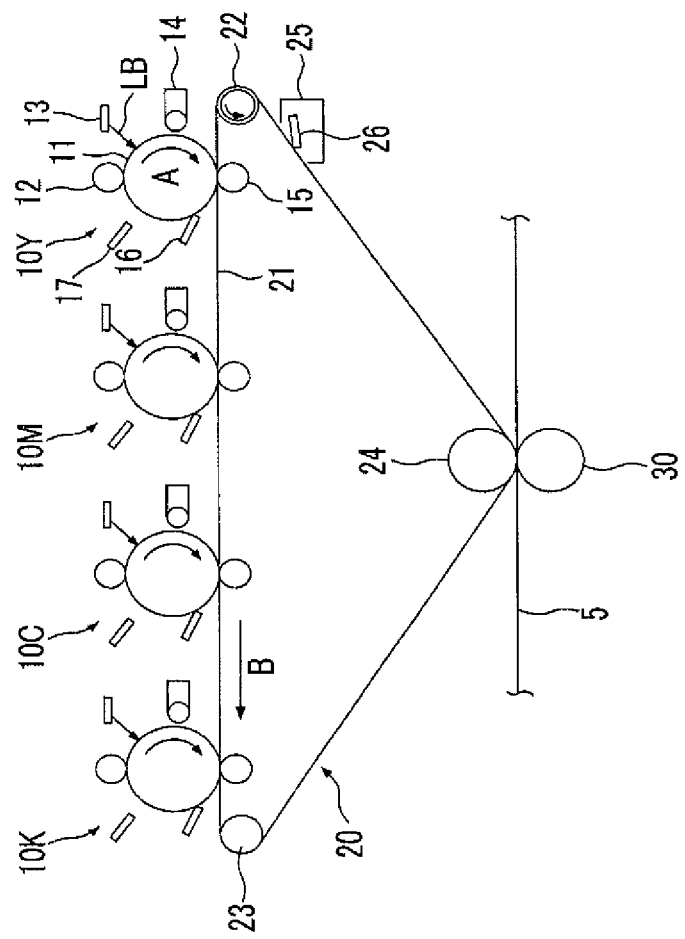
FIG. 2 is a configuration diagram illustrating an image forming portion of the image forming apparatus according to the first exemplary embodiment of the invention.

As illustrated in FIG. 2, each of the image-forming devices 10 includes a photosensitive drum 11 as an example of a rotating image holding member. Each of the below-described devices is principally arranged around the photosensitive drum 11. As the principal devices, there are a charging device 12 that causes a circumferential surface (an image holding surface) of the photosensitive drum 11 on which an image can be formed to be charged to a necessary electrical potential, an exposing device 13 as an electrostatic latent image forming unit that forms electrostatic latent images (for each type of color) having potential differences by irradiating the charged circumferential surface of the photosensitive drum 11 with light based on image information (signal), a developing device 14 as an example of a developing unit that develops the electrostatic latent images using the corresponding toner color of the developers to obtain the toner images, a primary image transfer device 15 that transfers each of the toner images to the intermediate image transfer device 20, a drum cleaning device 16 that performs cleaning by eliminating an adhered substance such as the toner which remains on and adheres to the image holding surface of the photosensitive drum 11 after a primary image transfer, and a charge-removal device 17 that removes a remaining electrical charge by performing exposure on the surface of the photosensitive drum 11.

The photosensitive drum 11 has the image holding surface which has a photoconductivity layer (a photosensitive layer) made of a photosensitive material on the circumferential surface of a cylindrical or columnar base material to be grounded. Power is transmitted to the photosensitive drum 11 from a rotational driving device (not illustrated), and the photosensitive drum 11 is supported so as to rotate in a direction indicated by the arrow A.

The charging device 12 is configured with a contact-type charging roll which is arranged in a state of being in contact with the photosensitive drum 11. A charging voltage is supplied to the charging device 12. As the charging voltage, when the developing device 14 performs reversal development, a voltage or a current having the same polarity as the charging polarity of the toner supplied from the developing device 14 is supplied thereto.

The exposing device 13 irradiates the charged circumferential surface of the photosensitive drum 11 with light LB which is constituted in accordance with the image information input to the image output device 2, thereby forming the electrostatic latent image. At the time of forming a latent image, the image information (signal) which is input to the image output device 2 by an arbitrary unit and is subjected to image processing in an image processing portion is transmitted to the exposing device 13.

Every developing device 14 is configured to include a developing roll which holds the developer and transports the developer to a developing region facing the photosensitive drum 11, agitation transport members such as two screw augers which transport the developer so as to supply to the developing roll while agitating the developer, and a layer thickness regulating member which regulates an amount (a layer thickness) of the developer held in the developing roll, being arranged inside the housing in which an opening portion and an accommodation chamber of the developer are formed. In the developing device 14, a developing bias voltage is supplied to a portion between the developing roll and the photosensitive drum 11 from a power source device (not illustrated). Power is transmitted to the developing roll and the agitation transport members from the rotational driving device (not illustrated), and the developing roll and the agitation transport members rotate in a necessary direction. As the developer, for example, a double-component developer including a nonmagnetic toner and a magnetic carrier is used.

In FIG. 1, reference numerals 140Y, 140M, 140C, and 140K respectively indicate toner cartridges as developer accommodating containers which accommodate the developers including at least the toner to be supplied to the corresponding developing devices 14. In the exemplary embodiment, only the toner is accommodated inside toner cartridges 140.

The primary image transfer device 15 is a contact-type image transfer device which comes into contact with the circumferential surface of the photosensitive drum 11 and rotates while including a primary image transfer roll to which a primary image transfer voltage is supplied. As the primary image transfer voltage, a DC voltage indicating a polarity opposite to the charging polarity of the toner is supplied from the power source device (not illustrated).

The drum cleaning device 16 is configured to include a container-shaped main body which is partially open, a cleaning plate which is arranged on the circumferential surface of the photosensitive drum 11 after the primary image transfer so as to come into contact therewith at a necessary pressure and performs cleaning by eliminating an adhered substance such as a residual toner, and a recovery device which recovers the adhered substance eliminated by the cleaning plate.

The charge-removal device 17 is configured to include an LED, a light-emitting lamp, or the like which removes an electrical charge remaining on the surface of the photosensitive drum 11 by performing exposure on the surface of the photosensitive drum 11.

As illustrated in FIGS. 1 and 2, the intermediate image transfer device 20 is arranged to be placed at a position below all the image-forming devices 10Y, 10M, 10C, and 10K. The intermediate image transfer device 20 is configured to include an intermediate image transfer belt 21 that rotates in a direction indicated by the arrow B while passing through a primary image transfer position between the photosensitive drum 11 and the primary image transfer device 15 (the primary image transfer roll), plural belt support rolls 22 to 24 that hold and rotatably support the intermediate image transfer belt 21 from an inner circumference thereof in a desired state, a secondary image transfer device 30 that is arranged on an outer circumferential surface (the image holding surface) side of the intermediate image transfer belt 21 supported by the belt support roll 24 and performs the secondary image transfer to the recording sheet 5 with the toner image on the intermediate image transfer belt 21, the toner which remains and adheres to the circumferential surface of the intermediate image transfer belt 21 after passing through the secondary image transfer device 30, and a belt cleaning device 25 that includes a blade-shaped cleaning member (a cleaning blade) 26 performing cleaning by eliminating an adhered substance such as paper dust.

An endless belt which is manufactured with a material in which a resistance adjustor such as carbon black is dispersed in a synthetic resin such as a polyimide resin and a polyamide resin, for example, is used as the intermediate image transfer belt 21. The belt support roll 22 is configured as a driving roll, and the belt support roll 24 is configured as a back-up roll for the secondary image transfer, and a belt support roll 23 is configured as a tension applying roll.

As illustrated in FIG. 1, the secondary image transfer device 30 is the contact-type image transfer device that comes into contact with the circumferential surface of the intermediate image transfer belt 21 and rotates while including a secondary image transfer roll to which a secondary image transfer voltage is supplied, at the secondary image transfer position which is an outer circumferential surface portion of the intermediate image transfer belt 21 which is supported by the belt support roll 24 in the intermediate image transfer device 20. A DC voltage indicating a polarity opposite to or the same as the charging polarity of the toner is supplied to the secondary image transfer roll 30 or the belt support roll 24 of the intermediate image transfer device 20 as the secondary image transfer voltage.

The fixing device 40 configured to include a roll-type or belt-type heating rotary member 41 that is heated by a heating unit so as to maintain a surface temperature at a predetermined temperature (approximately 150° C. to 180° C.), and a roll-type or belt-type pressurizing rotary member 42 that comes into contact with the heating rotary member 41 at a necessary pressure and rotates which are arranged therein. In the fixing device 40, a contact portion in which the heating rotary member 41 and the pressurizing rotary member 42 come into contact with each other becomes a fixing processing portion performing necessary fixing processing (heating and pressurizing) including heating to heat the recording medium 5.

Figure 3A:
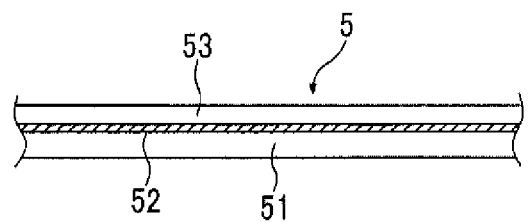
FIGS. 3A to 3C are cross-sectional configuration diagrams illustrating sheets of label paper.
Figure 3B:
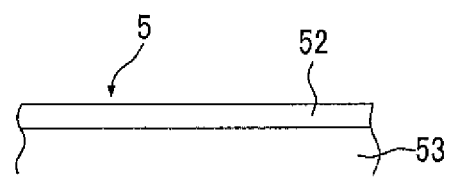
Figure 3C:
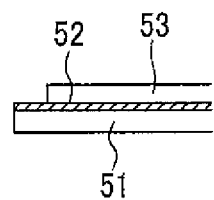

Incidentally, the sheet feeding device 3 includes roll paper 61 formed by rolling the elongated continuous paper 5 in a roll state which is continuous as the recording medium, thereby supplying the continuous paper 5 from the roll paper 61. The sheet feeding device 3 is arranged on an upstream side along a transport direction of the continuous paper 5 of the image output device 2 in a separate state. For example, as illustrated in FIGS. 3A to 3C, the continuous paper 5 generally adopts so-called label paper formed by causing a surface base material 53 to adhere on separate paper 51 made with glassine paper and the like which functions as backing paper and are abandoned when used. The surface base material 53 is provided in the uppermost layer via an adhesive layer 52 as an adhesive such as paste and an intermediate layer made of an adhesive. The surface base material 53 is made with a synthetic resin-made sheet such as polypropylene (PP) and polyethylene-terephthalate (PET), or paper such as fine quality paper and coated paper. Label paper 5 is provided to be used by printing patterns or letters on a surface of the surface base material 53. Although depending on the usage thereof, for example, the label paper 5 is provided as the roll paper 61 rolled in the roll state so as to cause the surface base material 53 side to be positioned on a surface (the outer circumferential surface) which is an image forming surface.

The sheet feeding device 3 includes the roll paper 61 that is rotatably driven in the clockwise direction by a driving unit (not illustrated), and a tension applying portion 62 that applies tension to the label paper 5 which is fed in accordance with rotations of the roll paper 61. The tension applying portion 62 is configured to include transport rolls 62a and 62b which transport the label paper 5, and a tension applying roll 62c to which an elastic force is applied in a direction away from the transport rolls 62a and 62b.

The image output device 2 includes a manual sheet feeding device 63 on a side surface positioned on the sheet feeding device 3 side of the housing 2a, in order to feed the recording medium from the outside. Inside the housing 2a of the image output device 2, there is provided the transport device 60 to transport the label paper 5 which is fed from the manual sheet feeding device 63, to the secondary image transfer position. The transport device 60 is configured to include a transport roll 64 that transports the label paper 5 while being in contact with a surface side (in the drawing, the rear side) opposite to the image forming surface of the label paper 5. The transport device 60 may be configured to include a pair of transport rolls which transport the label paper 5 in a nipped state, or a discharge roll (not illustrated) which outwardly discharges the label paper 5 in which an image is formed on a downstream side of the fixing device 40. The transport device 60 is acceptable as long as the device transports the label paper 5 as the recording medium. The transport device 60 may be configured to include the tension applying portion 62 and a tension applying portion 65 which are respectively arranged inside the sheet feeding device 3 and the sheet discharge device 4, or a transport roll (not illustrated) which changes the transport direction of the label paper 5 as the recording medium.

The sheet discharge device 4 that discharges and accommodates the label paper 5 in which an image is formed by the image output device 2 is arranged on the downstream side of the image output device 2. The sheet discharge device 4 includes the tension applying portion 65 that applies tension to the label paper 5, and a winding roll 66 that is rotatably arranged in the clockwise direction in the drawing and winds the label paper 5 in the roll state. The tension applying portion 65 is configured to included transport rolls 65a and 65b which transport the label paper 5, and a tension applying roll 65c to which an elastic force is applied in a direction away from the transport rolls 65a and 65b. A trimming device 67 that trims the label paper 5 as necessary may be arranged in an entrance portion of the sheet discharge device 4.

Figure 4:
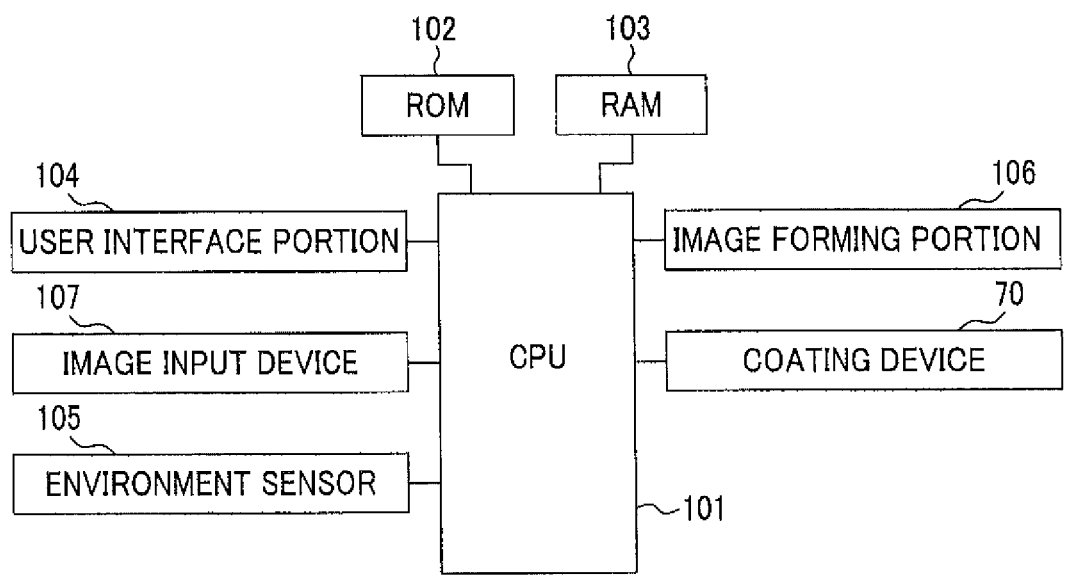
FIG. 4 is a block diagram illustrating a control circuit.

FIG. 4 describes the control device that controls an operation of the image forming apparatus.

In FIG. 4, reference numeral 101 indicates a CPU which generally controls image forming operations of the image forming apparatus 1. The CPU 101 controls the image forming operations while referring to a program stored in a ROM 102, a parameter stored in a RAM 103, and the like.

Reference numeral 104 indicates a user interface portion through which a user inputs a type, a size, and the number of sheets to be printed of the recording medium 5 including the label paper on which an image is formed. Reference numeral 107 indicates an image input device. Reference numeral 105 indicates an environment sensor which detects at least any one of an environmental temperature and an environmental humidity of a place where the image output device 2 is installed. Reference numeral 106 indicates the image forming portion of the image output device 2. Reference numeral 70 indicates a coating device that coats the label paper 5 with the coating agent, as described below in detail. The user interface portion 104 can designate a size and a type of the label paper 5 when forming an image.

Basic Operation of Image Forming Apparatus

Hereinafter, a basic image forming operation by the image output device 2 of the image forming apparatus 1 will be described.

Here, a description will be given regarding the image forming operation while forming a full-color image which is configured by combining the toner images of four types of color (Y, M, C, and K) using the four image-forming devices 10Y, 10M, 10C, and 10K of the image output device 2. An image forming operation while forming one or more-color toner image among any of the four types of color (Y, M, C, and K) using the four image-forming devices 10Y, 10M, 10C, and 10K of the image output device 2 is similarly performed.

When the image output device 2 receives command information requiring an image forming operation (printing), the four image-forming devices 10Y, 10M, 10C, and 10K, the intermediate image transfer device 20, the secondary image transfer device 30, the fixing device 40, and the like are activated.

Then, in each of the image-forming devices 10Y, 10M, 10C, and 10K, firstly, each photosensitive drum 11 rotates in the direction indicated by the arrow A, and each charging device 12 charges the surface of each photosensitive drum 11 to a necessary polarity (the negative polarity in the first exemplary embodiment) and electrical potential. Subsequently, the exposing device 13 irradiates the charged surfaces of the photosensitive drums 11 with the light LB which is emitted based on an image signal obtained by converting information of an image input to the image output device 2 into each of color components (Y, M, C, and K), thereby respectively forming the electrostatic latent images in color components configured on the surfaces thereof at necessary potential differences.

Subsequently, the developing devices 14Y, 14M, 14C, and 14K respectively supply the toners in the corresponding color (Y, M, C, and K) charged to necessary polarities and cause the same to adhere electrostatically, with respect to the electrostatic latent images of the color components respectively formed in the photosensitive drums 11, thereby performing the developing. On account of the developing, the electrostatic latent images of the color components respectively formed in the photosensitive drums 11 are manifested as the toner images of the four types of color (Y, M, C, and K) respectively developed by the toners in the corresponding color.

Subsequently, when the toner images in each type of color respectively formed on the photosensitive drums 11 of the four image-forming devices 10Y, 10M, 10C, and 10K are transported to the primary image transfer position, the primary image transfer device 15 performs the primary image transfer with the toner images in each type of color in a state where the toner images sequentially overlap with respect to the intermediate image transfer belt 21 which rotates in the direction indicated by the arrow B of the intermediate image transfer device 20.

In each of the image-forming devices 10 in which the primary image transfer is completed, after the drum cleaning device 16 cleans the surface of the photosensitive drum 11 by removing an adhered substance such as the toner remaining on the surface of the photosensitive drum 11 in a scraping manner, the charge-removal device 17 removes the electrical charge remaining on the surface of the photosensitive drum 11. Accordingly, each of the image-forming devices 10 is in a state of being able to perform the following image-forming operation.

Subsequently, in the intermediate image transfer device 20, the toner image which is subjected to the primary image transfer by rotations of the intermediate image transfer belt 21 is held and is transported to the secondary image transfer position. Meanwhile, in the sheet feeding device 3 and the sheet discharge device 4, prior to the image-forming operation, the label paper 5 is introduced into the housing 2a of the image output device 2 from the sheet feeding device 3 via the manual sheet feeding device 63, and the label paper 5 is drawn out to the outside of the image output device 2 through the secondary image transfer position and the fixing device 40 from the transport roll 64 of the transport device 60. Then, a leading edge of the label paper 5 is wound around the winding roll 66 via the tension applying portion 65 of the sheet discharge device 4. The label paper 5 fed from the sheet feeding device 3 at the time of forming an image is accommodated in the sheet discharge device 4 after being transported through the inside of the image output device 2 at a necessary transport speed.

At the secondary image transfer position, the secondary image transfer device 30 collectively performs the secondary image transfer with the toner images on the intermediate image transfer belt 21 to the label paper 5. In the intermediate image transfer device 20 after the secondary image transfer is completed, the belt cleaning device 25 performs cleaning by eliminating an adhered substance such as a residual toner on the surface of the intermediate image transfer belt 21 after the secondary image transfer.

Subsequently, the label paper 5 to which the secondary image transfer is performed with the toner images is transported to the fixing device 40 after being separated from the intermediate image transfer belt 21 and the secondary image transfer roll 30. In the fixing device 40, necessary fixing processing (heating and pressurizing) is performed, and the unfixed toner images are fixed to the label paper 5. Lastly, the label paper 5 after fixing is completed is discharged to the outside of the image output device 2 and is wound by the winding roll 66 provided inside the sheet discharge device 4.

On account of the operation described above, the label paper 5 having a full color image formed by combining the toner images of the four types of color is output.

Configuration of Feature Portion of Image Forming Apparatus

FIG. 1 is a configuration diagram illustrating the coating device in which a coating agent according to the first exemplary embodiment of the invention is applied.

As illustrated in FIG. 1, the coating device 70 includes an accommodating container 72 that accommodates a liquid mixture 71 in which powder and liquid are mixed, a stirring device 73 as an example of a stirring unit that stirs the liquid mixture 71 accommodated inside the accommodating container 72, coating members 74 that coat both end portions of the label paper 5 with the liquid mixture 71, and a supply device 75 as an example of a supply unit that supplies the liquid mixture 71 from the accommodating container 72 to the coating members 74. The accommodating container 72, the coating members 74, and the supply device 75 are connected to one another by a transport tube 76 that transports and supplies the liquid mixture 71.

Inside the accommodating container 72, the liquid mixture 71 is accommodated as the coating agent in which powder and liquid are mixed. As the powder, for example, silica, polymethylmethacrylate (PMMA), zinc stearate (ZnSt), calcium carbonate, and talc may be adopted. A particle diameter (number average particle diameter) of the powder is desirably set to range of 0.5 μm to 14 μm, for example. When the particle diameter of the powder is less than 0.5 μm, the powder is likely to be buried in the adhesive layer 52 of the label paper 5 so that it is difficult to maintain a tack (adhesion of the adhesive) depression effect. When the particle diameter of the powder exceeds 14 μm, it is not desirable due to an insufficient tack (adhesion of the adhesive) depression effect of an initial stage.

In more detail, it is desirable for the powder to have a high tack depression effect to depress the adhesive configuring the adhesive layer 52 exposed on end portions of the label paper 5 from moving to other members, and it is not likely to be buried in the adhesive exposed on the end portions of the label paper 5.

The inventors, in conformity of the inclination ball tack test which is a "method of testing an adhesive tape and an adhesive sheet" standardized by JIS Z 0237, have carried out evaluation tests to relatively evaluate the tack depression effect by using a roll in place of the ball. The evaluation tests for the tack depression effect are carried out using silica of which the particle diameter (the number average particle diameter) of the powder is 0.04 μm, PMMA of which the particle diameter is 0.5 μm, ZnSt of which the particle diameter is 6 μm, calcium carbonate of which the particle diameter is 14 μm, and talc of which the particle diameter ranges from 40 μm to 80 μm. The powder is mixed with hydrofluoroether (manufactured by Sumitomo 3M Limited, brand name: "Novec") as the liquid at concentration of 3% by weight to prepare the liquid mixture 71, thereby performing coating. PP/KV 11 (manufactured by Lintec Corporation) is used as the label paper 5.

A burying property of the powder is qualitatively evaluated by observing a burying state of the powder with respect to the adhesive layer 52 of the label paper 5 using an electron microscope in cases before and after the label paper 5 which is coated with the liquid mixture 71 on the end portions passes through the secondary image transfer position of the image output device 2.

Figure 5:
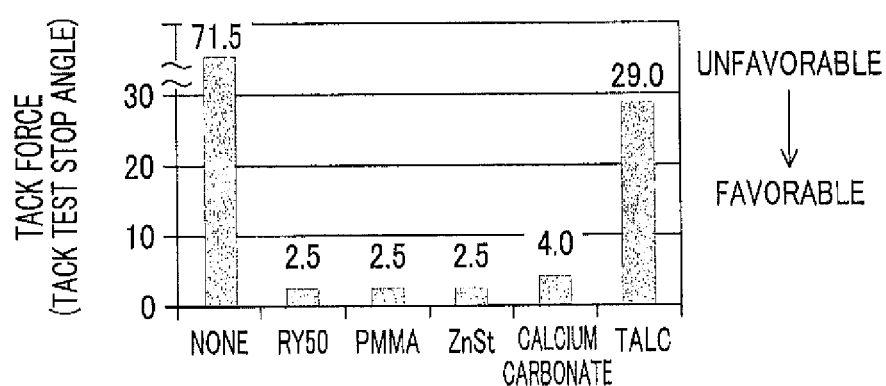
FIG. 5 is a graph illustrating relationships between particle diameters of powder and tack forces.
Figures 6, 7:
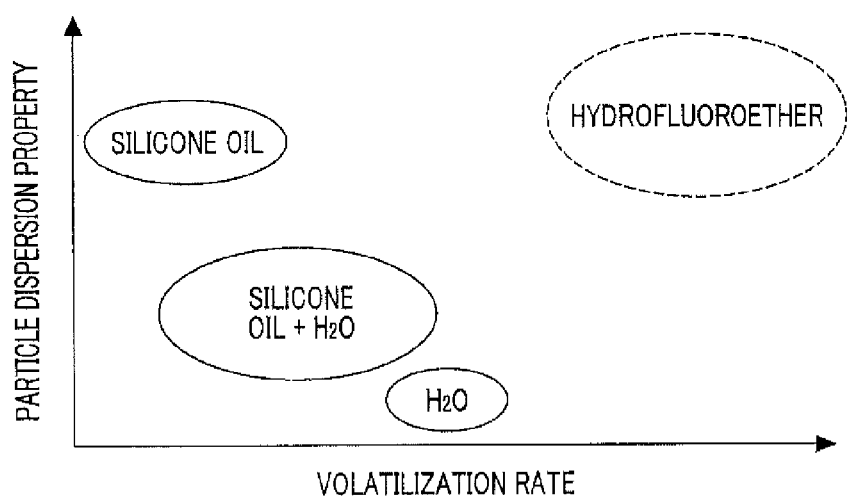
FIG. 6 is a table illustrating relationships among the particle diameters of the powder, tack depression effects, and burying-resistant properties.
FIG. 7 is a graph illustrating relationships between volatilization rates and particle dispersion properties, respectively corresponding to types of liquids.

FIGS. 5 and 6 are a graph and a table illustrating a result of the evaluation described above.

As is obvious in FIG. 5, it has been found that all of silica, PMMA, ZnSt, and calcium carbonate have extremely small stop angles ranging from 2.5 degrees to 4.0 degrees in a tack test for a tack force, thereby exhibiting an excellent tack depression effect. In contrast, while the stop angle is lower than the 71.5 degrees of the stop angle indicating a tack force when there is no coating performed with the powder, it has been found that talc at a stop angle of 29.0 degrees indicates a tack force which is a drastically larger value when compared to silica, PMMA, and the like, thereby being insufficient in the tack depression effect. The reason therefor is assumed because talc has a particle diameter ranging from 40 μm to 80 μm which is larger than those of other types of powder, and it is difficult to obtain a sufficient tack depression effect when talc adheres to the adhesive layer 52 of the label paper 5.

As is obvious in FIG. 6, although silica is quite favorable in the intended tack depression effect, the particle diameter thereof is 0.04 μm which is extremely small compared to those of PMMA and the like. Thus, it has been found that silica is easily buried in the adhesive layer 52 of the label paper 5 and is insufficient in a burying-resistant property, according to the observation result using an electron microscope.

Regarding the burying-resistant property of the powder, there is an effect of a shape (practical sphericity) of the powder in addition to the particle diameter. In the present exemplary embodiment, when compared to one another at the same particle diameters, for example, at 6 μm, it has been found that the burying-resistant property can be obtained if the practical sphericity is equal to or less than 0.8, and in contrast, the burying-resistant property becomes insufficient if the practical sphericity exceeds 0.8. Here, when the powder has the particle diameter of 6 μm, it is difficult to prepare the powder of which the practical sphericity is less than 0.15, and thus, it is desirable to have the practical sphericity ranging from 0.15 to 0.8.

The aforementioned term "practical sphericity" denotes a value calculated by the following expression regarding a shape of a projection image, after analyzing the image of the powder captured by using the electron microscope. Besides, the value becomes 1 in a case of a spherical shape, and the value becomes smaller as the shape changes.

The expression is practical sphericity=diameter of circle corresponding to projection area/diameter of minimum circumscribed projection circle.

Meanwhile, as the liquid of the liquid mixture 71, various types of liquid may be used as long as the powder can be held in a dispersed state. However, in consideration of a residual effect when coating the label paper 5, it is desirable to have a vaporization property. As the liquid thereof, for example, hydrofluoroether (manufactured by Sumitomo 3M Limited, brand name: "Novec"), ethyl ether, acetone, silicone oil, and water ($H_2O$) can be exemplified. As illustrated in FIG. 7, the liquid of the liquid mixture 71 desirably has a high particle dispersion property and a high volatilization rate so as to be easily volatilized. When the liquid of the liquid mixture 71 has a low volatilization rate such as that of water, silicone oil, and the like, it is not desirable since it is difficult for the liquid to be vaporized until the label paper 5 comes into contact with the image forming unit such as the transport roll 64 or the intermediate image transfer belt 21 after coating the label paper 5, thereby easily causing secondary problems like adhering to the intermediate image transfer belt 21 and the like with which the label paper 5 comes into contact so as to disturb the toner image. Among others, hydrofluoroether (manufactured by Sumitomo 3M Limited, brand name: "Novec") is particularly desirable as it has low surface tension and viscosity and a favorable dispersion property of the powder since hydrofluoroether is easily mixed with the powder, is able to stably supply a proper amount, and is able to prevent contamination by remaining to the members. Moreover, hydrofluoroether easily adheres to the end portions of the recording paper or a belt when performing the coating, is practically nontoxic, has no flash point so as to be excellent in safety, may be supplied through a simple configuration since the liquid itself is easy to handle, has volatility (boiling point ranging from 34° C. to 98° C.), has high thermal and chemical stability, and may prevent the fixing member from being contaminated.

The concentration of the powder with respect to the liquid of the liquid mixture 71 is determined in consideration of the tack (adhesion of the adhesive) depression effect, a coating property of the liquid mixture 71, the dispersion property of the powder, and the like. For example, the concentration is set to range approximately from 1% by weight to 15% by weight. In the exemplary embodiment, the liquid mixture 71 of which the concentration of the powder is 6% by weight is adopted. The above-described concentration of the powder is merely an example, and it may be set to other values, naturally.

The stirring device 73 uniformly disperses the powder in the liquid by stirring the liquid mixture 71. When liquid in which the powder can be uniformly dispersed therein is adopted as the liquid mixture 71, the stirring device 73 is not necessarily adopted. When liquid having volatility is used, since the stirring device 73 prevents the liquid from being volatilized, in consideration of using a sealable container as the accommodating container 72, it is desirable to arrange a rotor made with a magnetic member inside the accommodating container 72 and to adopt a magnet stirrer which rotates the rotor from the outside by a magnetic force so as to perform a stirring operation. However, the stirring device 73 is not limited to the magnet stirrer. Therefore a stirring device of other methods such as a rotating blade method may be adopted as long as a state where the volatilization of the liquid may be prevented is obtained.

The supply device 75 supplies the liquid mixture 71 accommodated inside the accommodating container 72 to the coating members 74. In the exemplary embodiment, a tubing dispenser is adopted as the supply device 75. The supply device 75 is arranged in the middle of the continuous transport tube 76 which supplies the liquid mixture 71 from the accommodating container 72 to the coating members 74. The supply device 75 nips the transport tube 76 by a rotation member in which plural balls or rolls are arranged along a circumferential direction. The supply device 75 presses the transport tube 76 from the upstream side toward the downstream side by rotating the rotation member, thereby moving and supplying the liquid mixture 71. The supply device 75 can adjust a supply amount of the liquid mixture 71 per unit time at high accuracy (±1% to 5%) over a range of 0.02 cc/min to 14 cc/min, for example, by changing the diameter of the transport tube 76 or a rotational speed of the rotation member. As the tubing dispenser, for example, Tubing Dispenser TOM. 100C (brand name, manufactured by Tomita Engineering Co., Ltd.) may be adopted. As the transport tube 76, for example, a tube made of Teflon (registered trademark) or made of silicon rubber is adopted. The supply device 75 is not limited thereto, and a device of other methods such as a liquid pump may be adopted as long as the liquid mixture 71 can be supplied. However, it is desirable to adopt the tubing dispenser in respect of being able to set the minute supply amount of the liquid mixture 71 at high accuracy.

Figure 8:
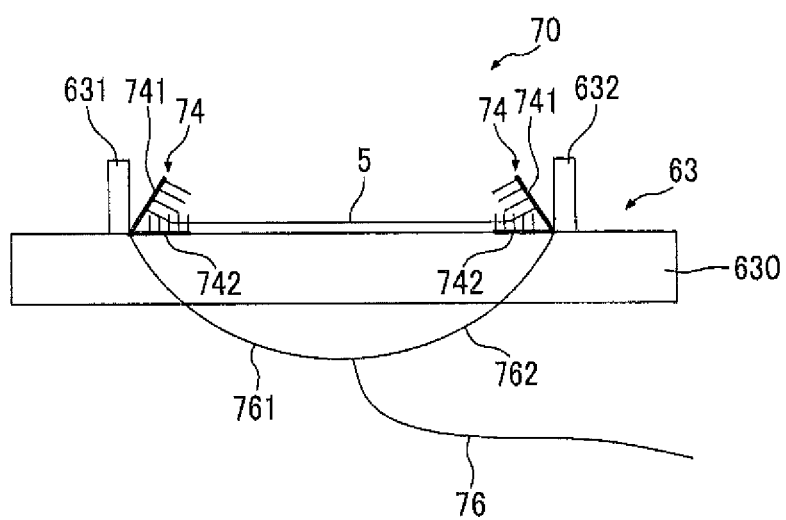
FIG. 8 is a configuration diagram illustrating a coating member of a coating device according to the first exemplary embodiment of the invention.

As illustrated in FIG. 1, the coating member 74 is arranged on an outer side surface of the image output device 2 and is mounted on the manual sheet feeding device 63 which is an example of the sheet feeding unit to guide and feed the label paper 5. As illustrated in FIG. 8, the manual sheet feeding device 63 includes a tabular tray body 630 that is arranged on a rear surface side (the separate paper 51 side) of the label paper 5 and regulates a position of the label paper 5 in an up-down direction along a vertical direction (hereinafter, also referred to as "thickness direction"). The manual sheet feeding device 63 includes a pair of guide members 631 and 632 as examples of a guide member that is movably arranged along a direction (hereinafter, also referred to as "width direction") intersecting with the transport direction of the label paper 5 with respect to the tray body 630 and regulates the positions of both end portions of the label paper 5 along the width direction so as to guide the label paper 5.

Figure 9A:
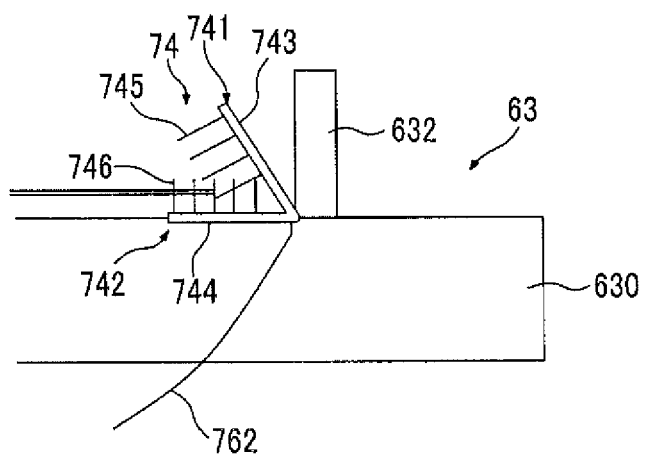
FIGS. 9A and 9B are configuration diagrams illustrating the coating members.
Figure 9B:
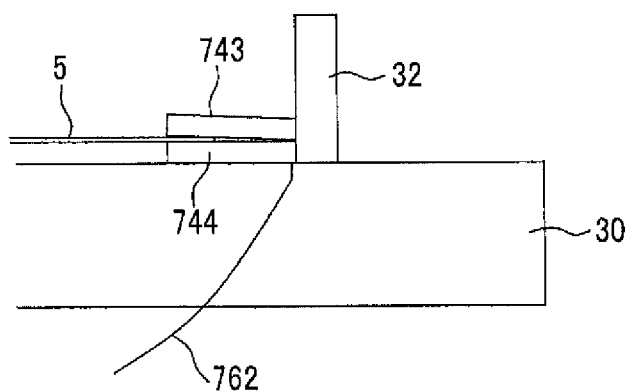

The coating members 74 are respectively arranged together with the pair of guide members 631 and 632 to be movable and detachably attached as necessary on inner sides of the guide members 631 and 632. Each of the coating members 74 includes an upper side coating member 741 and a lower side coating member 742 that are respectively arranged on a front surface side and a rear surface side of the label paper 5. The upper side coating member 741 is arranged in a state of being inclined so as to be positioned above the end portion of the label paper 5 with respect to the front surface of the tray body 630. Meanwhile, the lower side coating member 742 is arranged horizontally along the front surface of the tray body 630. As illustrated in FIGS. 9A and 9B, the upper side coating member 741 and the lower side coating member 742 are configured to respectively include tabular sheet-shaped members 743 and 744 which are made with non-woven fabrics or sponges and have liquid impregnating ability. The upper side coating member 741 and the lower side coating member 742 are also configured to respectively include brush members 745 and 746 on which brush hair is transplanted in a state of respectively facing surfaces of the sheet-shaped members 743 and 744 and partially intersecting therewith. An edge portion of the transport tube 76 is diverged into two portions. Edge portions 761 and 762 of the diverged transport tube 76 are connected to the coating members 74 which are respectively arranged on both sides of the manual sheet feeding device 63. The liquid mixture 71 supplied to the coating members 74 is supplied to the brush members 745 and 746 via the sheet-shaped members 743 and 744 due to a capillary phenomenon.

The coating members 74 are not necessarily arranged on each of the front surface side and the rear surface side of the label paper 5, and may be arranged on only a side (for example, the surface base material 53 side) where the adhesive layer 52 of the continuous paper 5 is exposed. The coating members 74, without having both of the sheet-shaped members 743 and 744, and the brush members 745 and 746, as illustrated in FIG. 9B, may be configured to have only the sheet-shaped members 743 and 744 made with non-woven fabrics and the like, without including the brush members 745 and 746.

Operation of Feature Portion of Image Forming Apparatus

Hereinafter, an operation of a feature portion of the image forming apparatus 1 will be described.

In the image forming apparatus 1, as described above, in the image output device 2, an image using the toners of yellow (Y), magenta (M), cyan (C), and black (K) is formed on the surface base material 53 of the label paper 5. In this case, as illustrated in FIGS. 3B and 3C, since the material configuring the separate paper 51 and the material configuring the surface base material 53 are different from each other in the label paper 5, there may be a case where the adhesive layer 52 is exposed on the end portion surface of the label paper 5, on account of differences in an expansion rate and a contraction rate when the label paper 5 absorbs moisture or when the label paper 5 is dry, particularly when an expansion amount of the surface base material 53 is large due to moisture absorption in a high temperature and high humidity environment.

If so, as illustrated in FIG. 1, when the place where the adhesive (the adhesive layer) is exposed, being positioned on the end portion surface of the label paper 5 comes into contact with the transport roll 64, the intermediate image transfer belt 21, the secondary image transfer roll 30, and the fixing roll 41, there is a possibility that the adhesive configuring the adhesive layer 52 may move from the label paper 5 to the image forming unit such as the transport roll 64 and the intermediate image transfer belt 21, thereby adhering thereto.

FIG. 10 is a photomicrograph illustrating an observation result of the end portion of the label paper 5 which is left in a high temperature and high humidity environment for one day (24 hours) using an optical microscope (manufactured by Keyence Corporation, Digital Microscope VH-8000).

As is obvious in FIG. 10, it has been found that the separate paper 51 positioned on the rear surface side of the label paper 5 absorbs moisture and protrudes from the end portion of the surface base material 53 made of polypropylene (PP) by approximately 0.2 mm, and the adhesive forming the adhesive layer 52 is exposed across from the upper surface of the separate paper 51 to the end surface of the surface base material 53.

The inventors has carried out an experiment measuring a protrusion amount (a deviation amount with respect to the surface base material 53) of the separate paper 51 which protrudes from the end portion of the label paper 5 when the label paper 5 is left for a long period (for 15 days) in a high temperature and high humidity environment (28° C., relative humidity 80%). As the label paper 5, sheets of PP/KV 11 (manufactured by Lintec Corporation) respectively having widths of 3 inches, 7 inches, and 10 inches are used.

FIG. 11 is a graph illustrating a result of an experimental example described above.

As is obvious in the drawing, the label papers 5 respectively having the widths of 7 inches and 10 inches tend to rapidly increase in the protrusion amount of the separate paper 51 as time passes in a high temperature and high humidity environment. However, the increasing tendency of the protrusion amount becomes saturated after approximately 6 days have elapsed, and the protrusion amount of the separate paper 51 indicates a large value such as approximately 0.7 mm which is the same value as that after 6 days, even though 15 days have elapsed.

Meanwhile, similar to the label papers 5 respectively having the widths of 7 inches and 10 inches, even though the label paper 5 having the width of 3 inches tended to increase in the protrusion amount of the separate paper 51 as time passes in a high temperature and high humidity environment, the increasing tendency becomes saturated and reaches a constant amount after approximately 3 days have elapsed. After 15 days have elapsed, even though the protrusion amount of the separate paper 51 tends to slightly increase compared to that at the time after 6 days have elapsed, the protrusion amount thereof indicates a relatively small value equal to or less than approximately 0.3 mm.

Next, the inventors have prepared an experimental benchmarking model of the image forming apparatus 1 illustrated in FIG. 1, and have carried out an experiment to check circumstances regarding an occurrence of contamination due to the adhesive. Provided are three types of the label papers 5 of which the surface base materials 53 are respectively the coated paper, polypropylene (PP), and polyethylene-terephthalate (PET). The label papers 5 are caused to travel 400 m in the high temperature and high humidity environment, thereby carrying out an experiment to evaluate the amount of the adhesive adhering to the surfaces of the intermediate image transfer belt 21, the secondary image transfer roll 30, and the fixing roll 41 through visual observations.

FIG. 12 is a table illustrating a result of the experiment described above.

As is obvious in FIG. 12, when the label paper 5 adopts the coated paper as the surface base material 53, even though a slight amount of the adhesive is observed to adhere to the intermediate image transfer belt 21, the coated paper indicates an acceptable level (O—). In contrast, when the label papers 5 adopt polypropylene (PP) and polyethylene-terephthalate (PET) as the surface base material 53, an extremely large amount of the adhesive configuring the adhesive layer 52 is observed to adhere to the intermediate image transfer belt 21 at the time after traveling 100 m, and thus, it has been found to indicate a practically unacceptable level (XX).

In contrast, no adhesion of the adhesive with respect to the secondary image transfer roll 30 and the fixing roll 41 is observed in a case of the surface base material 53 being any one of the coated paper, polypropylene (PP), and polyethylene-terephthalate (PET), which are favorable (O). The reason therefor is assumed that when the surface base material 53 is the coated paper, since the expansion rate of the coated paper is substantially equivalent to that of the separate paper 51, the protrusion amount of the separate paper 51 is small; since the secondary image transfer roll 30 is positioned on the rear surface side (the separate paper 51 side) of the label paper 5, the adhesive is unlikely to adhere thereto; and since the fixing roll 41 has a release property, the adhesive is unlikely to adhere thereto as well.

Therefore, in the exemplary embodiment, as illustrated in FIG. 1, the coating members 74 of the coating device 70 is arranged in the manual sheet feeding device 63 that transports the label paper 5 supplied from the sheet feeding device 3, to the inside of the image output device 2. FIG. 8 illustrates a configuration in which the coating members 74 coat the end portions of the label paper 5 along the width direction on the front surface side and the rear surface side with the liquid mixture 71 in which the powder and liquid are mixed. In this case, since hydrofluoroether having volatility is adopted as the liquid in the liquid mixture 71, for example, the liquid is vaporized before the label paper 5 comes into contact with the image forming unit as the contact target member such as the intermediate image transfer belt 21, resulting in a state where only the powder out of the liquid mixture 71 adheres to the exposed adhesive layer 52 (the adhesive) of the label paper 5.

Therefore, even when the label paper 5 is transported to pass through the secondary image transfer position which comes into contact with the intermediate image transfer belt 21, only the powder out of the liquid mixture 71 is interposed between the place of the label paper 5 where the adhesive is exposed and the intermediate image transfer belt 21, and thus, the adhesive may be prevented or suppressed from moving and adhering to the intermediate image transfer belt 21 from the place of the label paper 5 where the adhesive is exposed due to the tack depression effect of the powder. In the exemplary embodiment, since the label paper 5 is coated with the powder which is mixed with the liquid as the liquid mixture 71, the powder is uniformly dispersed in the liquid of the liquid mixture 71. Thus, the end portions of the label paper 5 can be evenly and reliably coated with the powder.

Similarly, even when the label paper 5 passes through the secondary image transfer roll 30, the fixing rotary member 41, the transport roll 64, and the like, the powder is interposed between the place of the label paper 5 where the adhesive is exposed and the contact target member such as the transport roll 64, and thus, the adhesive may be prevented or suppressed from moving and adhering to the transport roll 64 and the like from the place of the label paper 5 where the adhesive is exposed.

The coating device 70 may perform the coating with the liquid mixture 71 at all times. However, the coating device 70 may be configured to coat the label paper 5 with the liquid mixture 71 only when the CPU 101 determines that at least any one of the environmental temperature and/or the environmental humidity detected by the environment sensor 105 is equal to or higher than the predetermined threshold value, or only when the recording medium 5 designated by the user interface portion 104 is the predetermined label paper. In these cases, the coating members 74 may be configured to be supplied or to stop being supplied with the liquid mixture 71 by causing the supply device 75 of the coating device 70 to drive or stop. As the predetermined label paper 5, label paper having a large amount of the adhesive, and label paper adopting an adhesive material of which the temperature of a glass transition point is low such as that of a refrigerator label may be exemplified.

First Experimental Example

Next, the inventors prepared an experimental benchmarking model of the image forming apparatus 1 illustrated in FIG. 1, and carried out an experiment to check circumstances regarding an occurrence of the contamination due to the adhesive and circumstances regarding an occurrence of secondary problems such as artifacts due to the adhesion of the liquid out of the liquid mixture 71. In a maintainability test in which one type of the predetermined label paper 5 is caused to continuously travel, roll paper (manufactured by Lintec Corporation, PP/KV 11) of which the surface base material 53 is made of polypropylene (PP), having the width of 210 mm is used as the label paper 5. In a system test in which the different types of the label paper 5 are appropriately changed to the laboratory environment of the high temperature and high humidity environment and a low temperature and low humidity environment so as to travel under a condition close to an actual use condition, plural types of label paper of which the surface base material 53 are any one of coated paper, non-coated paper, polypropylene (PP), and polyethylene-terephthalate (PET), having the width of 7 inches to 13 inches and the length of 10 m to 400 m are appropriately mixed to be used. The travel distance of the label paper 5 in the maintainability test is set to 10,500 m (50 KPV), and the travel distance of the label paper 5 in the system test is set to 7,300 m (35 KPV).

In the liquid mixture 71, zinc stearate (ZnSt) having the particle diameter of 6 μm is adopted as the powder, and hydrofluoroether (manufactured by Sumitomo 3M Limited, brand name: "Novec 7100") which is mixed thereto at the concentration of 6% by weight is adopted as the liquid. The coating amount of the liquid mixture 71 is set to two types such as 8 g/400 m and 16 g/400 m for one surface of the label paper 5.

FIG. 13 is a table illustrating a result of the first experimental example described above.

As is obvious in FIG. 13, in both the maintainability test and the system test, there is no occurrence of the contamination by the adhesive (paste) and the secondary problem with respect to the intermediate image transfer belt 21, and thus, favorable results can be obtained in both cases.

When the surface of the intermediate image transfer belt 21 after completing the maintainability test is observed using a microscope, there is no occurrence of adhesion or filming of the powder observed on the surface of the intermediate image transfer belt 21 after passing through the blade 26 of the cleaning device 25.

Second Experimental Example

The inventors have carried out an experiment measuring a coating rate with respect to a holding amount of the liquid mixture when a different material is used for the coating members 74. As the coating members 74, members adopting the brush members 745 and 746 are used as illustrated in FIG. 9A, and members adopting the sheet-shaped members 743 and 744 made with non-woven fabrics are used as illustrated in FIG. 9B. Nylon brushes to which carbon is added are adopted as the brush members 745 and 746, and members made with ordinary non-woven fabrics are adopted as the sheet-shaped members 743 and 744. Both thereof are adopted to be different in density.

Figure 14:
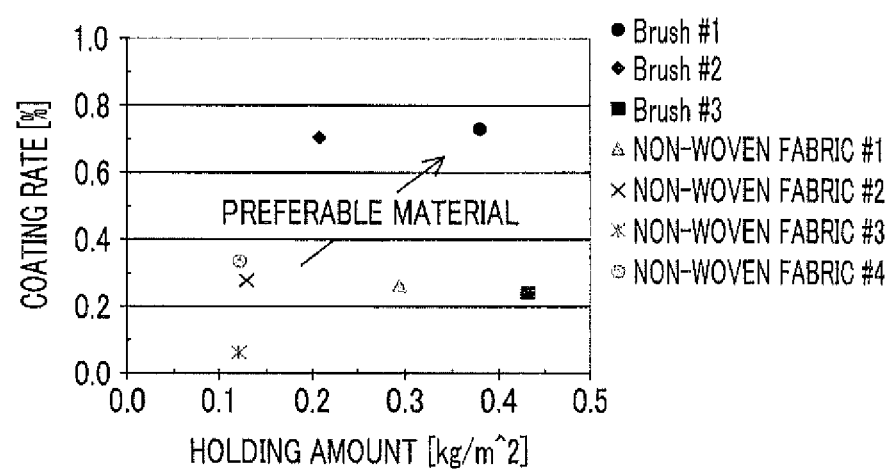
FIG. 14 is a graph illustrating relationships between holding amounts and coating amounts of liquid mixtures, respectively in material properties of the coating members.

FIG. 14 is a graph illustrating a result of a second experimental example.

As is obvious in FIG. 14, it has been ascertained that regarding the coating rate with respect to the holding amount of the liquid mixture 71, the coating members 74 which adopt the brush members 745 and 746 indicate a more favorable value than the coating members 74 which adopt the sheet-shaped members 743 and 744.

Second Exemplary Embodiment

Figure 15:
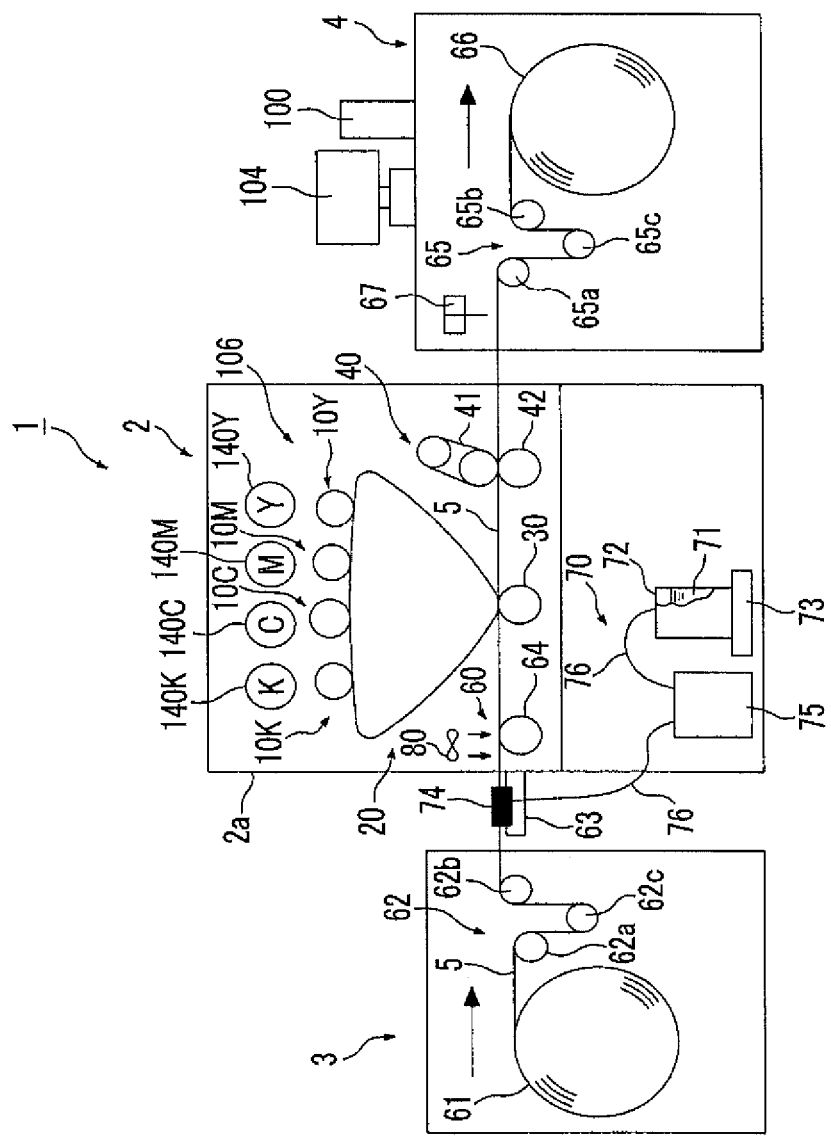
FIG. 15 is a configuration diagram illustrating the image forming apparatus according to a second exemplary embodiment of the invention.

FIG. 15 illustrates an overall scheme of the image forming apparatus according to a second exemplary embodiment.

As illustrated in FIG. 15, inside the housing 2a of the image output device 2, the image forming apparatus 1 according to the second exemplary embodiment includes a blowing device 80 as the vaporization promoting unit that promotes vaporization of the liquid in the liquid mixture 71 with which both end portions of the label paper 5 are coated by the coating members 74 of the coating device 70.

The blowing device 80 may be arranged above the coating members 74 which are mounted on the manual sheet feeding device 63. However, when an air flow by the blowing device 80 comes into direct contact with the coating members 74, there is a possibility of vaporization of the liquid in the liquid mixture 71 which is held in the coating members 74, before coating the label paper 5. Thus, it is desirable to configure the blowing device 80 to blow air to the label paper 5 after being coated with the liquid mixture 71 by the coating members 74.

As the vaporization promoting unit, a heating device which promotes vaporization of the liquid in the liquid mixture 71 by heating the label paper 5 coated with the liquid mixture 71, or an exhaust device which promotes vaporization of the liquid in the liquid mixture 71 by exhausting air around the label paper 5 may be adopted separately from the blowing device 80 or together with the blowing device 80. The vaporization promoting unit is particularly effective when liquid having relatively low volatility is used as the liquid in the liquid mixture 71.

Third Exemplary Embodiment

Figure 16A:
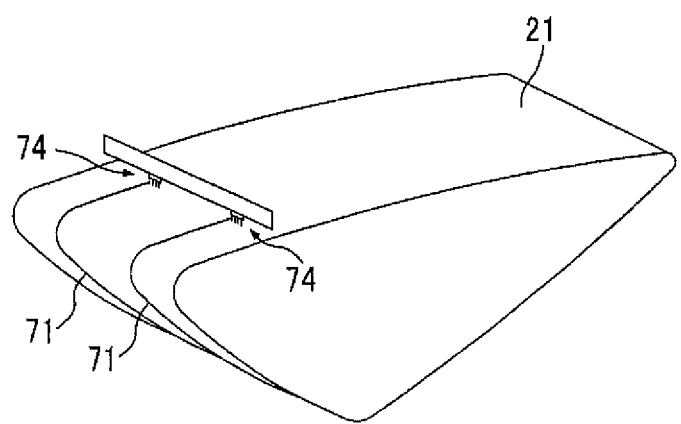
FIGS. 16A and 16B are configuration diagrams illustrating principal portions of the image forming apparatus according to a third exemplary embodiment of the invention.
Figure 16B:
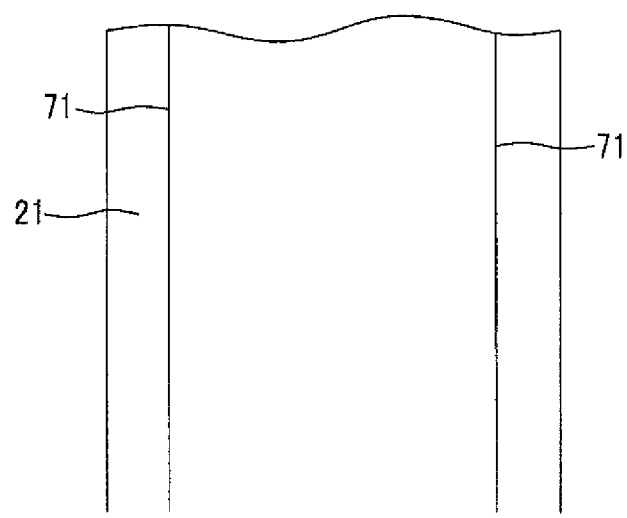

FIGS. 16A and 16B illustrate overall schemes of the image forming apparatus according to a third exemplary embodiment.

As illustrated in FIGS. 16A and 16B, the image forming apparatus 1 according to the third exemplary embodiment has a configuration in which the recording medium 5 is not coated with the liquid mixture, but the intermediate image transfer belt 21 as the image forming unit which comes into contact with the place (both end portions) of the label paper 5 where the adhesive is exposed is coated with the liquid mixture 71. The image output device 2 includes each of the coating members 74 at positions corresponding to both end portions of the label paper 5 along the width direction on the downstream side of the image-forming device 10K for black (K). The liquid mixture 71 is supplied to the coating members 74 from the supply device 75 of the coating device 70.

In the surface of the intermediate image transfer belt 21 coated with the liquid mixture 71, the liquid is volatilized so that the surface of the intermediate image transfer belt 21 is in a state where the surface is coated with only the powder. Therefore, when the intermediate image transfer belt 21 moves and comes into contact with the label paper 5 at the secondary image transfer position, only the powder in the liquid mixture 71 is interposed between the intermediate image transfer belt 21 and the exposed adhesive of the label paper 5.

Therefore, the exposed adhesive of the label paper 5 may be prevented or suppressed from being moved and adhering to the intermediate image transfer belt 21.

In this case, as is obvious in the experimental result illustrated in FIG. 11, since the protrusion amount of the separate paper 51 of the label paper 5 is approximately 0.7 mm, the width to be coated with the liquid mixture 71 by the coating members 74 may be approximately 1 mm to 2 mm. The powder with which the surface of the intermediate image transfer belt 21 is coated is cleaned by the belt cleaning device 25.

In the exemplary embodiment described above, a case where an electrophotographic image forming unit is employed as the image forming unit is described. However, without being limited thereto, the image forming unit may adopt an ink jet recording type or an electrostatic recording type, or a printing type such as an offset printing.

In the exemplary embodiment described above, a case where the coating device 70 is arranged in the image output device 2 is described. However, without being limited thereto, the coating device 70 may be configured to be arranged in the sheet feeding device 3.

In the exemplary embodiment described above, a case where the label paper 5 supplied from the roll paper 61 is coated with the liquid mixture 71 is described. However, the roll paper 61 may be configured to be directly coated with the liquid mixture 71. In this case, the coating may be performed with the liquid mixture 71 while manufacturing the roll paper 61 or after manufacturing the roll paper 61, the liquid configuring the liquid mixture 71 does not necessarily have the volatility as long as the liquid does not cause a disadvantage such as an occurrence of creases on the label paper 5 configuring the roll paper 61 when the roll paper 61 is coated. In this case, the roll paper 61 which is coated with the liquid mixture 71 and in which the powder adheres to the exposed adhesive in the end portions (cross sections) of the label paper 5 circulates as the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transport device comprising:
 a transport roll that transports a recording medium which includes an image forming layer, an adhesive layer, and a base layer; and
 a coating device that causes powder included in a liquid mixture to be interposed between the recording medium and the transport roll by applying the liquid mixture to the recording medium or to the transport roll which comes into contact with the recording medium,
 wherein the liquid mixture includes the powder and a volatile liquid, the powder reducing adhesion of the adhesive layer, and
 wherein the coating device comprises a coating member including an upper side brush member and a lower side brush member that are respectively arranged on a front surface side and a rear surface side of the recording medium.

2. A transport device according to claim 1, wherein the coating device causes only the powder included in the liquid mixture to be interposed between a place of the recording medium where the adhesive is exposed and the transport roll by applying the liquid mixture to the recording medium or to the transport roll which comes into contact with the recording medium.

\* \* \* \* \*